Fig. 1.

United States Patent Office 3,504,246
Patented Mar. 31, 1970

3,504,246
POSITIONAL DISPLACEMENT TRANSDUCER
ARRANGEMENTS
Alexander Russell and Leslie James Coates, Glasgow,
Scotland, assignors to National Research Development
Corporation, London, England, a British corporation
Filed Oct. 3, 1967, Ser. No. 672,624
Claims priority, application Great Britain, Oct. 5, 1966,
44,488/66; Nov. 23, 1966, 53,180/66
Int. Cl. G05b 11/01
U.S. Cl. 318—18                        10 Claims

ABSTRACT OF THE DISCLOSURE

Arrangement for providing digital indication of the position of a movable object along a predetermined movement path which comprises a plurality of multi-section commutators and associated contact brushes coupled through reduction gearing and to the movable object, groups of digital indicator lamps controlled by each commutator and adjustable switching means for altering the connections between said commutators and the lamps controlled thereby to permit zero setting of the digital indication at any position of the object.

---

Figure 2:
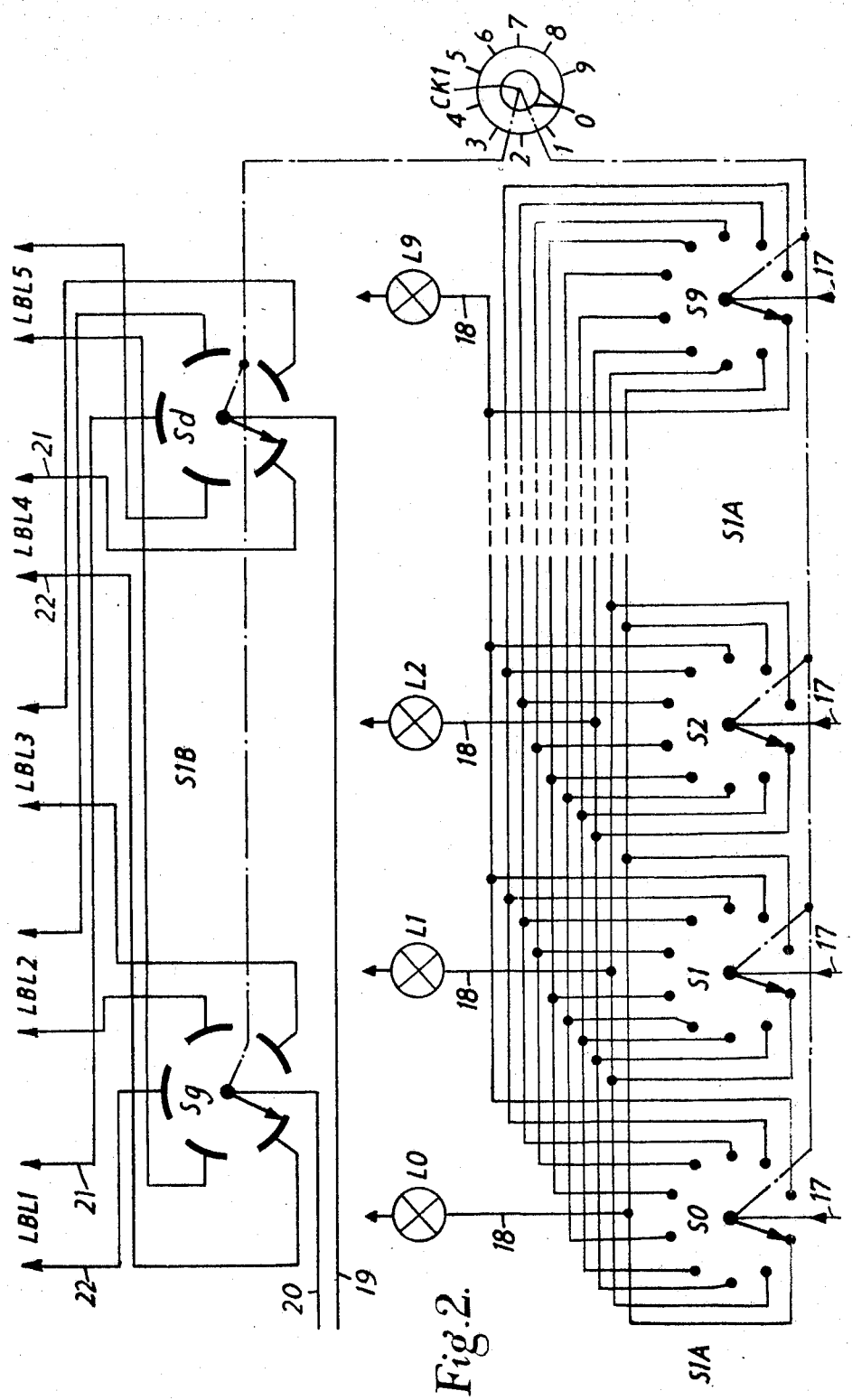

This invention relates to transducer arrangements for providing a numerical indication of the position of a movable object, such as a machine tool, and is more particularly, although not exclusively, concerned with arrangements of the kind described in co-pending patent application No. 570,526.

In many positional transducer applications, for instance in connection with the digital indication or definition of the position of the tool in a machine tool such as a centre lathe, it is desirable to provide a facility which permits "zero suppression," that is to say, the ability to use as a zero datum point for the digital measurements or position indications one which is not coincident with the true zero point of the primary encoding means which continuously determine the position of the movable object, e.g. tool, and which may be one or more optical grating systems and/or commutator or other electrical-mechanical devices. Thus, in the particular case of a centre lathe it is usually desirable to "face" the billet or other workpiece and then to make the tool position correspond to this face surface the zero reference point to which all of the subsequent displacement measurements or indications are related.

One object of the present invention is the provision of a relatively inexpensive form of zero suppression for positional displacement transducer arrangements, particularly those of the kind described in the aforesaid earlier application, while another object is the provision of an improved decimal digitiser which is provided with a zero suppression facility.

According to the invention an arrangement for providing a numerical indication of the position of a movable object along a defined path, comprises encoder switching means controlled by said movable object for causing energisation of the particular one of a group of position-defining signal output channels which identifies the actual position of such object within a range of consecutively numbered and contiguously related portions of said path, a corresponding group of position indication or measurement means, one for each of the consecutive position identification numbers used and electric switching means connected between said output channels and said indication or measurement means to effect ordered cross-connection of each of said output channels with any different one of said indications or measurement means thereby to introduce a common degree of shift of the indication or measurement value assigned to each of said output channels.

The nature of the invention will be more readily understood from the following description of one practical embodiment as applied to an arrangement resembling those of the aforesaid co-pending application and comprising in each digital encoder section a ten-segment commutator to provide a decimal form of output indication, given by way of illustrative example only and with reference to the accompanying drawings in which—

Figure 1:
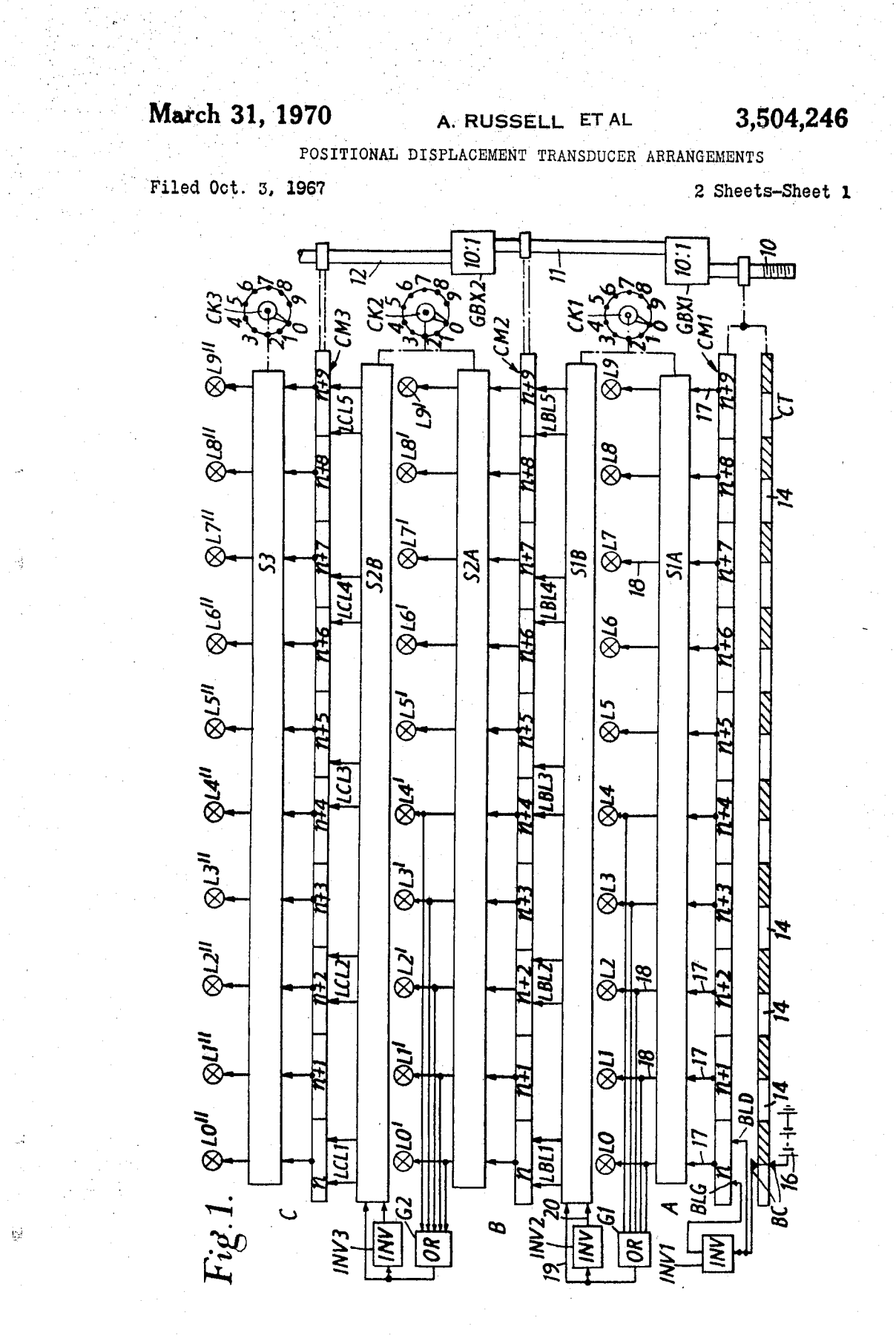

FIGURE 1 is a largely block schematic diagram of a three decimal digit transducer arrangement suitable for use with a lathe or other similar machine tool, while FIGURE 2 is a more detailed circuit diagram showing the controlled switching arrangements of one digit section of the arrangement shown in FIGURE 1.

Referring first to FIGURE 1 of the drawings, the arrangement shown comprises three decimal digit encoder sections A, B and C, section A being that for the digit of least significance or $10^{\circ}$, the second section being that associated with the next more significant decimal digit, $10^1$, and section C being that for the most significant decimal digit, $10^2$.

The digital section A comprises a commutator CM1 which, although shown in flat or developed form, is normally in the form of a segmented disc or drum rigidly secured to a rotatable part controlling the position of the movable object along the defined travel path of the latter. As illustrated the disc or drum forming the commutator CM1 is rigidly secured to and rotates in unison with a lead screw 10 of a centre lathe. The commutator CM1 has ten equal length segments $n$, $n+1$, $n+2$, ... $n+9$, the segment $n+9$ being, of course, contiguous with the first segment $n$. This commutator CM1 is engaged by two stationary contact brushes BLD and BLG which are angularly spaced apart relative to the rotational movement path of the commutator by an angle of 18°, i.e. my an amount equal to half of the angular spread of one segment. These brushes provide alternative inputs respectively for the "lag" and "lead" input interrogation waveforms for operation in a manner similar to that described in the aforesaid co-pending application.

The lead and lag waveform inputs to brushes BLD and BLG may be provided from the digital encoder section having still lesser digital significance, i.e. $10^{-1}$ if such an encoder section is present but in the example shown such lead and lag interrogation waveforms are provided by means of an additional or clock track CT formed on the same member as the commuator CM1 on a separate member which is also rigidly connected to the lead screw 10. This clock track comprises 10 electrically conductive segments 14, each of 18° angular extent, and each separated from its neighbouring conductive segments by an 18° extent of non-conductive segment. Such clock track is engaged by a pair of fixed contact brushes BC whereby a circuit is completed from a D.C. current source 16, shown as a battery for simplicity, whenever the brushes BC are in contact with a conductive segment. Thus during one complete rotation of the lead screw 10 a "lead" output in the form of a series of ten pulses will be provided through the brushes BC with each square pulse coincident in timing with the movement of the commutator through an angle equal to one half of a segment of the commutator CM1 and with each intervening quiescent period coincident with the other half of a commutator segment. From the resultant square pulse "lead" waveform, which is precisely similar to that described in the aforesaid earlier application, there is derived an inverse or complementary "lag" waveform through inverter means INV1. Such "lag" waveform comprises a similar series of square pulses which are at an on or active level during the intervals between the pulses of the "lead" waveform. The change points from on to off and vice versa of the lead and lag waveforms coincide with the instants when the brushes BLG and BLD are either symmetrically disposed one on each side of a division between adjacent segments or are both symmetrically disposed on one segment.

Such derived lead and lag waveforms are then fed respectively to the two brushes BLD and BLG of the commutator CM1 to allow, according to the particular state of the respective lead and lag waveforms, the appropriate changeover of output indication at each point of digit change of the commutator during its movement as will be described in greater detail later.

Output connections 17 are provided, e.g. by way of suitable slip ring connections, from each of the separate segments of the commutator CM1. These output connections serve eventually to control selective operation of ten indicator lamps L0, L1, L2, . . . L9 but instead of being directly connected to one related indicator lamp, each output 17 from a segment of the commutator CM1 is connected to the input of a ten pole 10-way rotary selector switch S1A. The form of this switch is shown in detail in FIGURE 2 and comprises ten separate single-pole 10-way sections S0, S1, S2, . . . S9 coupled for simultaneous operation. The movable contact of each switch section is connected to the related connection 17 from the commutator CM1 while the ten fixed contacts of each section are interconnected with one another and with each of ten output leads 18 in the ordered manner as shown. The respective output leads 18 connect to the indicator lamps L0, L1, L2, . . . L9.

The interconnections set up by the respective switch sections between the ten connections 17 and the ten output leads 18 are, as will be seen from FIGURE 2, altered by one step for each of the ten positions of the switch. Thus if the switch is in a position where the first section S0 is connecting its lead 17 to, say, lamp L0, the next section S1 will connect its lead 17 to lamp $L^1$ and so on. If now the switch is altered by three stepping positions, S0 will connect to lamp L3, S1 to lamp L4, and so on, the last section S9 now connecting its lead 17 to the lamp L2, i.e. that immediately preceding the lamp L3 to which the first section S0 is connected. The position of the switch is controlled by manually operable means CK1 such as a pointer knob having a numbered scale associated therewith. Each section of the switch S1A may be of the continuously rotatable type capable of movement through more than 360° sweep but more preferably and for simplicity of construction each of such switch sections is made movable over only a limited arc slightly in excess of 360° with the use of flexible pigtail connections to its movable contact.

Referring now again to FIGURE 1, in addition to the output connections to the related indicator lamps L0, L1, . . . L9, the output leads 18 to lamps L0, L1, . . . L4 are each connected to an "OR" or buffer gate G1 to form the "lead" interrogation waveform for use in the next, more significant, digit section B exactly as in the arrangement of the earlier application; from this "lead" waveform is derived a complementary "lag" waveform by means of an inverter INV2.

Such further "lead" and "lag" waveforms are applied respectively over leads 19, 20 to the inputs of a two-pole 5-way rotary switch S1B which is mechanically coupled for operation in unison with the switch S1A by the single 10-position control CK1. The form of this switch S1B is also shown in FIG. 2 and comprises two single-pole 5-way sections $Sd$ and $Sg$ coupled for simultaneous operation and with each fixed contact of arcuate extent sufficient to ensure that it is engaged by the movable contact at two of the ten stepping positions of the control CK1. The fixed contact of section $Sd$ engaged by the movable contact when the control CK1 is in positions 0 and 1 serves to connect the "lead" input connection 19 to the lead 21 of a first output pair while the similar fixed contact of section $Sg$ simultaneously connects the "lag" input connection 20 to lead 22 of the same output pair. The other fixed contacts are arranged in similar manner so that the five pairs of outputs from this switch S1B are made operative in turn in coincidence with the five pairs of positions 0/1, 2/3, . . . 8/9 on control CK1. These lead pairs are connected as shown to the five-spaced input brush pairs LBL1 . . . LBL5 in engagement with a second ten-segment commutator CM2 forming part of the encoder means B for the next significant digit. Such commutator is driven from the same means, e.g. the lead screw 10, which drives the first commutator CM1 but through a 10 to 1 reduction gearbox GBX1 which causes shaft 11 to which the commutator CM2 is secured, to rotate by one tenth of the amount of the lead screw 10. The respective brushes of each pair LBL1 . . . LBL2 are angularly spaced from each other by 18° relative to the 360° sweep of the commutator while the angular spacing between either brush of the pair LBL1 and the corresponding brush of pair LBL2 is 72+7.2 i.e. 79.2°. Similarly the angular spacing between the corresponding brushes of pairs LBL2 and LBL3, LBL3 and LBL4 and between those of LBL4 and LBL5 is 79.2°.

The respective output connections from the second commutator CM2 are then taken, in a manner similar to those from the commutator CM1, to a further ten-pole 10-way rotary switch S2A which is of a form identical with that of the switch S1A and is arranged to operate in similar manner. The respective switch outputs are connected to the associated indicator means such as lamps L0', L1', . . . L9' while the outputs to the lamps L0', L1, . . . L4' are also used to form the "lead" and "lag" interrogation waveforms for the next more significant digit section C by means of a further "OR" gate G2 and inverter INV3. Such further derived "lead" and "lag" waveforms, before application to the further ten-segment commutator CM3 of the next higher significant digit section C, are taken, as in the case of the lower significant digit section B, to a two-pole 5-way switch S2B which is mechanically connected with the switch S2A for operation in unison by the ten-position control knob CK2. The switch S2B is of similar form to switch S1B already described.

The five pairs of outputs from this switch are connected to five pairs of spaced brushes LCL1 . . . LCL5 operative upon the commutator CM3 with angular spacings as already stated for those of commutator CM2. This commutator CM3 is similarly arranged to be mechanically driven from the shaft 11 controlling the previous commutator CM2 through a second 10 to 1 reduction gearbox GBX2 and shaft 12 whereby shaft 12 rotates by $\frac{1}{100}$th of the extent of the input lead screw 10. The respective outputs from this third ten-segment commutator CM3 are then applied to the respective inputs of a further ten-pole 10-way switch S3 which is similar to the switches S2A and S1A and whose outputs are connected directly to the digit indicator means, such as lamps L0'', L1'', . . . L9''.

The operation of the arrangement when the switches S1A, S1B, S2A, S2B and S3 are in the "0" position is substantially similar to that as described in the aforesaid co-pending application. According to the rotational movement imparted to the lead screw 10 to move the tool away from the true zero or datum of the encoder arrangements, the respective commutators CM1, CM2, CM3 will take up positions causing illumination of the appropriate indicator lamps of the different digit sections A, B and C to signal the digital value of the tool position.

Thus, by way of example only, if the lead screw 10 has a lead of 0.1 inch, the digit section A will indicate displacements in steps of 0.01 inch, the digit section B will indicate displacement in steps of 0.1 inch and the digit section C will indicate displacement in steps of 1.0 inch. If the respective A, B and C section indicator lamps L2, L5' and L3'' are illuminated the object, i.e. tool, position is then one which is 3.52 inches displaced from the real zero or datum point of the encoder system.

The "lead" waveform provided from the clock track CT is on or at active level while the lead brush BLD is moving over the central half length of any segment of the commutator CM1 while the "lag" waveform is similarly on or at active level while the lag brush BLG is moving over the central half of any segment. The changes from "lag" waveform on to "lead" waveform on take place while the lead brush BLD is in contact with the higher value segment of any adjacent pair and the lag brush BLG is in contact with the lower value segment of the pair. Under optimum conditions of adjustment the two brushes are ¼ segment length displaced on each side of the division between the segments of the pair.

The instant of change of indication value is determined by the instant of change over of the "lead" and "lag" waveforms. For example, if the commutator CM1 is moving in the direction to increase the displacement and is, say, at a position where change from "0" to "1" is about to occur, then lamp L0 is illuminated through the supply of the "lag" waveform to brush BLG to segment $n$. Brush BLD is already in contact with segment $n+1$ so that, as the "lag" waveform goes off and the "lead" waveform comes on, the lamp L1 is illuminated through brush BLD. In similar manner, the "lead" interrogation waveforms for the other digit sections B and C are at active or on level whilst the digit of next lower significance has the valve 0, 1, 2, 3, or 4 whereas the "lag" interrogation waveform for the same section is at active or on level whilst such lower significance digit has the value 5, 6, 7, 8 or 9, the instants of change being again those when the lower significance digit is passing through 9 to 0 or 0 to 9, and, also, through 4 to 5 or 5 to 4. At the instants when such lower significant digit section A is changing from 9 to 0 or from 0 to 9, the next more significant section commutator CM2 will be in a position where the respective brushes BLD and BLG are in contact with two different segments. In consequence, if the change is an upward or increasing one the lag waveform is initially on and being applied to the brush BLG causes energisation of the lower value of the two indicator lamps associated with the commutator segments at that moment engaged by the brushes BLD, BLG. At the instant when the lower significant digit changes from 9 to 0, the lag waveform goes off and the lead waveform goes on. This, being fed to the brush BLD, immediately causes energisation of the next, higher, value indicator lamp, thereby avoiding any possibility of error due to lack of exact synchronism of movement of the higher value commutator with the lower value commutator. A similar but reversed action occurs when the digital value is decreasing.

If the control CK1 is now operated to impose a shift of the output indication or measurement, the indicated value of, for example L0 (10°, section A) may be caused to occur when the commutator CM1 is in any position. The other section A values will then occur when the commutator is moved by different amounts away from the new zero or datum thus set up. Similarly shift of the more significant digit sections B and C can be introduced by operation of controls CK2, CK3.

Since the lead and lag interrogation waveforms for the next more significant digit sections are derived from the L0 . . . L4 indication outputs, these waveforms are automatically corrected in their timing but, by reason of the geared interconnection between the different commutators, the position of any one brush pair, such as LBL1, cannot be altered, relatively to the divisions between the co-operating segments, to allow for the, now changed, timings of the related "lead" and "lag" waveforms with which they are supplied.

One solution to the problem would be to provide ten separate pairs of brushes, such as LBL1, the brushes of each pair being 18° apart and the similar brushes of the pairs being displaced progressively by 3.6° and then to arrange for selection of the correct pair by the shift control for the digit section of next lower significance. Such a construction is usually impracticable for mechanical reasons. One alternative is that shown where only five pairs of brushes, such as LBL1 . . . LBL5 or LCL1 . . . CL5 are provided and arranged each to deal with the adjacent digit values. By spacing such brush pairs to embrace the whole of the periphery of the commutator, congestion is avoided and the construction simplified.

By appropriate manipulation of the controls CK1, CK2, CK3 and the consequent shift of connections imposed by the coupled ten pole 10-way switches and the associated two-pole 5-way switches, the effective zero point, so far as the digital indicator means and all subsequent movement of the object are concerned, can be set to coincide with any point along the total movement path of the object.

While a total of three decades has been described it will be obvious that the arrangement may be extended or reduced as desired. By the provision of the initial clock track on the least significant digitizer section, the arrangement becomes a complete measuring device in itself. If, however, the primary input to the device is from an optical grating as in the aforesaid earlier embodiments, then the clock track CT is not necessary and the initial "lead" and "lag" waveforms for the brushes BLG and BLD can be derived directly from such optical grating section of least digital significance.

While, in the arrangement described, the multiple segment commutator elements are made movable and the co-operating brushes are fixed, it will be apparent that a reversed arrangement in which the commutator elements are stationary and the brushes are movable may be employed.

The principle of the arrangement as described may equally well be applied to mechanical, magnetic, optical or fluid logic methods of switching or control and to movement paths which are not rectilinear.

We claim:

1. An arrangement for providing a numerical indication of the position of a movable object along a defined path which comprises: a group of position-defining signal output channels; encoder switching means coupled to said movable object and to said output channels for causing energization of the particular one of said group of position defining signal output channels which identifies the actual position of such object within a range of consecutively numbered and contiguously related portions of said path; a corresponding group of position indication or measurement means, one for each of said consecutive position identification numbers, and electric switching means connected between said output channels and said indication or measurement means for effecting ordered cross-connection of each of said output channels with any different one of said indication or measurement means thereby to introduce a common degree of shift of the indication or measurement value assigned to each of said output channels.

2. An arrangement according to claim 1 in which said position indicating or measurement means comprise visual number indicators.

3. An arrangement according to claim 2 in which the numerical position indication or measurement is in decimal number form.

4. An arrangement according to claim 3 which comprises a plurality of encoder switching means and a corresponding plurality of groups of position indication or measurement means for identifying different path portions in terms of a multi-digit decimal number.

5. An arrangement according to claim 4 which comprises 10-1 speed change gear mechanism and a plurality of ten position encoder switching means coupled serially for conjoint movement in accordance with the movement of said object through said 10-1 speed change gear mechanism.

6. An arrangement according to claim 5 in which said defined movement path of the object is rectilinear and in which each of said encoder switching means is a switch movable through a circular path which, for all of said decimal digits except that of greatest significance, is in excess of 360°.

7. An arrangement according to claim 6 in which each of said encoder switching means comprises a commutator device having ten equal switch sections arranged around a circular path.

8. An arrangement according to claim 7 in which each of said commutator devices is provided with at least one pair of connection-establishing brushes which are spaced apart along the movement path of said commutator by an angle equal to one half the angle subtended by one section of said commutator and in which said brushes are arranged to be supplied with current alternately as the commutator is moved whereby one brush is energised as the commutator approaches each position of digit value change and the other brush is energised as the commutator departs from such position of digit value change, the instant of change-over of brush energisation coinciding with the positioning of the commutator at the correct change of value position.

9. An arrangement in accordance with claim 1 which comprises a first commutator having ten segments each of 36° angular width mechanically coupled to the movable object for movement in unison therewith, a first pair of contact brushes in engagement with said first commutator at positions 18° apart, an inverter, a clock or timing track composed of ten conductive segments each of 18° width alternating with ten non-conductive segments of 18° width rigidly coupled to said first commutator for movement in unison therewith, brush means for co-operation with said clock track to control supply of current from a suitable source directly to one of said first pair of contact brushes and through said inverter to the other of said first pair of contact brushes, first shift control switch means comprising a ten-pole 10-way switch having its respective inputs to its ten movable switch contacts connected one to each of said first commutator segments and a first digit group of ten position identifying signal channels each connected to a different one of the ten fixed contacts associated with each of said ten movable switch contacts.

10. An arrangement in accordance with claim 9 which comprises a second commutator also having ten segments each of 36° angular width and also mechanically coupled to said movable object for movement in unison therewith at one tenth of the speed of said first commutator, five pairs of contact brushes in engagement with said second commutator, the respective first and second brushes of each pair being at positions 18° apart and the pairs being so displaced from one another that the respective first and second brushes of adjacent pairs are 79.2° apart, a two-pole 5-way switch connected for operation by a first shift control member in unison with said ten-pole 10-way switch of said first shift control switch means, the input to one of the movable switch contacts of said two-pole 5-way switch being connected directly to five adjacent channels of said first digit group of ten position identifying channels, an inverter, the other movable switch contact of said two-pole 5-way switch being connected to the same five position identifying channels through said inverter, and the respective sets of five fixed contacts of said two-pole 5-way switch being connected to different ones of the respective first and second brushes of said pairs of brushes, a second shift control switch means comprising a ten-pole 10-way switch having its respective inputs to its ten movable switch contacts connected one to each of said second commutator segments and a second digit group of ten position identifying signal channels each connected to a different one of the ten fixed contacts associated with each of the said ten movable contacts of said second shift control switch.

References Cited

UNITED STATES PATENTS 3,189,764 6/1965 Gaureau et al.
3,320,589 5/1967 Jensen _____ 307—115 XR BENJAMIN DOBECK, Primary Examiner U.S. Cl. X.R.

307—115